United States Patent [19]

Inoue et al.

[11] Patent Number: 5,422,967
[45] Date of Patent: Jun. 6, 1995

[54] SELF-ROUTING OPTICAL SWITCH AND OPTICAL SWITCH ARRAY

[75] Inventors: Hiroaki Inoue, Hidaka; Hirohisa Sano, Kokubunji; Toshio Kirihara, Kokubunji; Shinji Nishimura, Kokubunji; Mari Ogawa, Kokubunji; Koji Ishida, Musashino, all of Japan

[73] Assignee: Hitachi, Ltd., Tokyo, Japan

[21] Appl. No.: 102,805

[22] Filed: Aug. 6, 1993

Related U.S. Application Data

[63] Continuation-in-part of Ser. No. 892,782, Jun. 3, 1992, Pat. No. 5,247,592, which is a continuation of Ser. No. 684,378, Apr. 12, 1991, Pat. No. 5,146,513, which is a continuation of Ser. No. 464,192, Jan. 12, 1990, Pat. No. 5,044,745.

[30] Foreign Application Priority Data

Jan. 30, 1989 [JP] Japan .................................. 1-017604
Aug. 7, 1992 [JP] Japan .................................. 4-211211

[51] Int. Cl.$^6$ ............................................. G02B 6/10
[52] U.S. Cl. ...................................... 385/16; 359/39
[58] Field of Search ................... 359/39, 53, 301, 117, 359/139, 135; 385/16

[56] References Cited

U.S. PATENT DOCUMENTS

| | | | |
|---|---|---|---|
| 4,795,225 | 1/1989 | Sakai et al. | 385/16 |
| 4,813,757 | 3/1989 | Sakano et al. | 385/16 |
| 5,033,811 | 7/1991 | Yanagawa et al. | 385/16 |
| 5,044,745 | 9/1991 | Inou et al. | 385/16 |
| 5,146,513 | 9/1992 | Inou et al. | 385/16 |
| 5,247,592 | 9/1993 | Inou et al. | 385/16 |

OTHER PUBLICATIONS

"An 8 mm Length Nonblocking 4×4 Optical Switch Array" by Inoue et al. IEEE Journal on Selected Areas in Communications pp. 1262-1266, 1988 (no date & mo.).

Primary Examiner—Akm E. Ullah
Attorney, Agent, or Firm—Antonelli, Terry, Stout & Kraus

[57] ABSTRACT

There is provided a self-routing optical switch array formed by connecting m stages of optical switches and set so as to satisfy the relation:

$$\lambda_{a1} < \lambda_1 < \lambda_{a2} \lambda_2 < \ldots < \lambda_{an} < \lambda_n \ldots < \lambda_{am} < \lambda_m < \lambda_s$$

where $\lambda_n$ is wavelength of an absorption edge of a switching region of an nth stage of the optical switch array; $\lambda_{an}$ is wavelength of destination signal light multiplexed with information signal light used in an optical switch located at the nth stage, and $\lambda_s$ is wavelength of the information signal light.

7 Claims, 4 Drawing Sheets

FIG. 9

|  | $\lambda_{a1}$ | $\lambda_{a2}$ | $\lambda_{a3}$ |
|---|---|---|---|
| OUTPUT END 71 | 1 | 1 | 1 |
| 72 | 1 | 1 | 0 |
| 73 | 1 | 0 | 1 |
| 74 | 1 | 0 | 0 |
| 75 | 0 | 1 | 1 |
| 76 | 0 | 1 | 0 |
| 77 | 0 | 0 | 1 |
| 78 | 0 | 0 | 0 |

SELF-ROUTING OPTICAL SWITCH AND OPTICAL SWITCH ARRAY

CROSS-REFERENCES TO RELATED APPLICATIONS

This is a continuation-in-part of U.S. application Ser. No. 892,782, filed on Jun. 3, 1992, now U.S. Pat. No. 5,247,592, which is a continuation application of U.S. application Ser. No. 684,378, filed on Apr. 12, 1991, now U.S. Pat. No. 5,146,513, which is a continuation application of U.S. application Ser. No. 464,192, filed on Jan. 12, 1990, now U.S. Pat. No. 5,044,745, the disclosure of which is hereby incorporated by reference.

BACKGROUND OF THE INVENTION

The present invention relates to optical components in optical information processing and optical communication systems, and in particular to large-capacity optical exchanges for exchanging broad-band high-speed optical signals.

Conventional semiconductor waveguide optical switches, optical switch arrays, and integrated semiconductor waveguide optical switches used in optical exchanges are described in the IEEE Journal on Selected Areas in Communications, J-SAC-6, pp. 1262–1266, 1988.

SUMMARY OF THE INVENTION

In the above described conventional technique, a carrier injection method and a single slip structure or a double slip structure were proposed as a techniques for shortening the device length of the waveguide optical switch and allowing large scale integration on a semiconductor substrate. For this purpose, a small-sized optical switch array suitable for large scale integration and suitable for increasing the capacity of optical exchanges was implemented. However, a technique for discriminating the destination of an information signal and connecting the input and output ends of the optical switch array was not considered at all. It was necessary to convert once the destination usually contained in the information signal to an electric signal, read it, and activate the drive circuit for the optical switch array according to the destination. If the signal speed was increased, therefore, the control drive circuit became complicated in application to an exchange for exchanging information of large capacity. This resulted in a problem that integration of larger scale and higher density was difficult.

An object of the present invention is to provide an optical switch and an optical switch array for optical exchange which solve the above described problem and which have a novel function (i. e., a self-routing function) of automatically outputting the information signal itself to the output end of the destination on the basis of destination information contained in the information signal.

The above described object is achieved by controlling the connection of optical switches by using destination signal light superposed on at least information signal light.

If carriers (electrons and/or holes) are injected into a compound semiconductor material, the carrier density in the semiconductor changes in the injected region, and a change of refractive index depending upon this change of carrier density is caused. In the conventional carrier injection optical switch, a p-n junction is formed in a region for conducting switching, and the carrier density, i.e., refractive index of the switching region is changed by letting a current flow. In accordance with the present invention, the switching region is adapted to absorb only destination signal light which is superposed on information signal light and which has a wavelength different from that of the information signal light, and the carrier density (refractive index) of the region is changed for a time sufficient for passing the information signal light. That is to say, the carrier density of the region is changed for a time equivalent to the duration time of the information signal light which is desired to be connected or for a time which is longer than that duration time and contains it. Thereby, the optical switch can be activated without exercising special destination control over the switch section by using an externally applied signal. As a result, self-routing of the information signal light becomes possible. Furthermore, for connecting the optical switches in multiple stages and forming an optical switch array, it suffices to set the wavelength of the optical absorption edge of the switching region of an optical switch located at the next stage so that it may become longer than the wavelength of the optical absorption edge in the switching region of the optical switch located at the preceding stage and shorter than the wavelength of information signal light. Thereby, multi-stage configuration becomes possible and a self-routing optical switch array can be easily realized. That is to say, assuming that the wavelength of information signal light is $\lambda_s$; the wavelength of the absorption edge of the switching region of the nth stage of an optical switch array having multiple stages (supposed to be m) is $\lambda_n$; and the wavelength of destination signal light multiplexed with information signal light used in an optical switch located at the nth stage is $\lambda_{an}$, it suffices to conduct setting so that the following relation may be satisfied:

$$\lambda_{a1} < \lambda_1 < \lambda_{a2} < \lambda_2 < \ldots < \lambda_{an} < \lambda_n \ldots$$
$$< \lambda_{am} < \lambda_m < \lambda_s$$

If a structure having a quantum size effect such as a multiple quantum well, a quantum wire, or a quantum box is led into at least the region in order to make the absorption spectrum characteristics of the switching region sharp, the wavelength interval can be made dense, and hence the present optical switch array can have a larger capacity. Furthermore, the above described quantum size effect causes a larger change of refractive index than that of the bulk material for a change of carrier density, and hence a higher efficiency can also be attained.

BRIEF DESCRIPTION OF THE DRAWINGS

FIG. 9 is a diagram illustrating the operation of a self-routing function of the embodiment 3.

DESCRIPTION OF THE PREFERRED EMBODIMENTS

Embodiment 1

Figure 1:
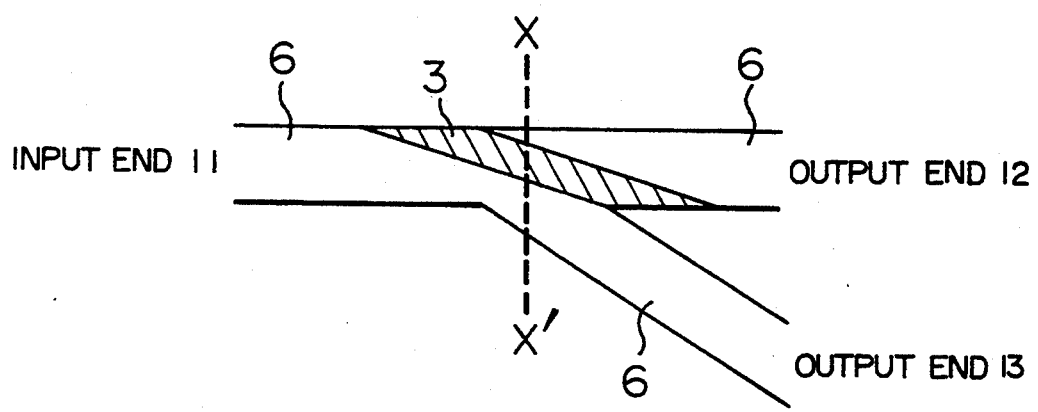
FIG. 1 is a waveguide structure diagram of an embodiment 1 according to the present invention.
Figure 2:
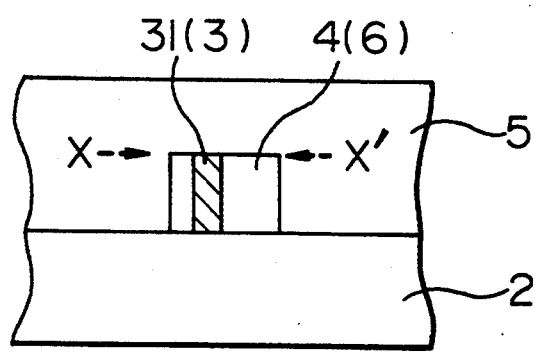
FIG. 2 is a diagram showing an example of cross section of the waveguide structure of the embodiment 1 according to the present invention.
Figure 3:
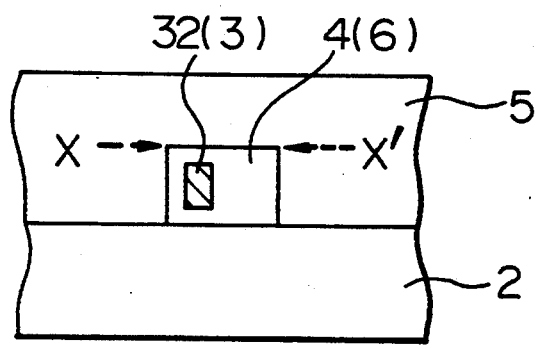
FIG. 3 is a diagram showing another example of the cross section of the waveguide structure of the embodiment 1 according to the present invention.

In the present embodiment, a Y-branch optical switch shown in FIG. 1 was formed. FIGS. 2 and 3 show examples of cross section taken along a broken line X—X' of FIG. 1. In the present embodiment, an InGaAsP optical absorption layer 31 (with an absorption edge wavelength $\lambda_0 = 1.29$ μm) functioning as a switching region 3 was grown on an InP substrate 2 by using the MOCVD method. Thereafter, while leaving only the switching region 3, the remaining InGaAsP optical absorption layer 31 was removed. Thereafter, an InGaAsP optical waveguide layer 4 (with an absorption edge wavelength $\lambda_g = 1.15$ μm) was selectively formed in the removed portion of the above described optical absorption layer 31 by using the selective growth technique of the MOCVD method. Then an optical waveguide 6 having a shape shown in FIG. 1 was formed by using the ordinary lithography technique and etching technique. The width of the formed optical waveguide 6 was 4 μm, and the branch angle of the Y-branch optical waveguide was 7°. Finally, buried growth using an InP cladding layer 5 was made.

To an input end 11 of the fabricated optical switch 11, semiconductor laser light having a wavelength of 1.31 μm was inputted as an information signal. Semiconductor laser pulse light having a wavelength of 1.27 μm was superposed on this inputted light as destination signal light and light rays emitted from output ends 12 and 13 were measured. When the intensity of the destination signal light was weak, most of the information signal light was outputted from the output end 12. As the intensity of the destination signal light was increased, the intensity of the information signal light outputted from the output end 12 gradually decreased and the intensity of the information signal light outputted from the output end 13 gradually increased. When destination signal light of approximately 0 dBm was inputted, the information signal light was completely switched from the output end 12 to the output end 13 and the insertion loss and the crosstalk were 5 dB and −25 dB, respectively. These values compared favorably with those of the optical switch in the conventional example driven by current injection. Thus the self-routing function of the optical switch by using wavelength multiplexing of the information signal light and destination signal light, which was the principle of the present invention, could be confirmed.

In the present embodiment, a buried optical waveguide structure shown in FIG. 2 was used as the sectional structure of the optical waveguide. However, such a shape that an InGaAsP optical absorption layer 32 is buried within an InGaAsP optical waveguide layer 4 as shown in FIG. 3 may be used instead. If at this time dimensions are set so that the equivalent refractive index that the guided light feels may become equal even if the InGaAsP optical absorption layer 32 exists partially in the InGaAsP optical waveguide layer 4, the leak of the information signal light to the output end 13, which is caused when the destination signal light is not inputted, is reduced and hence the characteristics of the optical switch are improved. Furthermore, the buried optical waveguide structure is used in FIGS. 2 and 3. As a matter of course, however, a similar effect can be obtained even if an optical waveguide structure of refractive index waveguide type such as ridge type, loaded type, BH type, or CSP type, which is a structure of optical waveguide commonly used, is used. Furthermore, InGaAsP is used as the semiconductor material. However, a similar effect can be obtained even if another semiconductor material like a III-V group semiconductor material such as GaAlAs or InGaAlAs, or a II-VI group semiconductor material is used.

Embodiment 2

Figure 4:
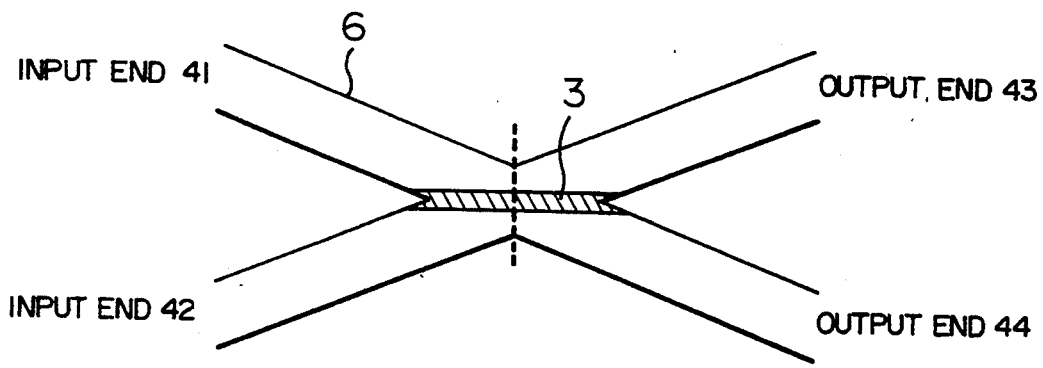
FIG. 4 is a diagram showing an example of a waveguide structure of an embodiment 2.
Figure 5:
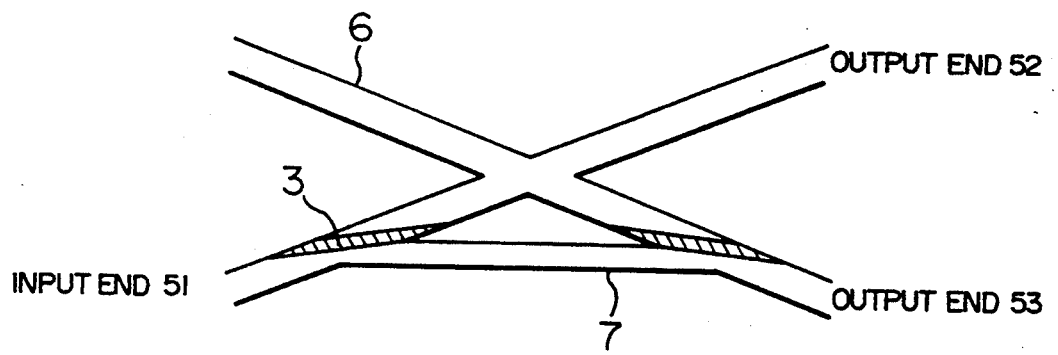
FIG. 5 is a diagram showing another example of the waveguide structure of the embodiment 2.
Figure 6:
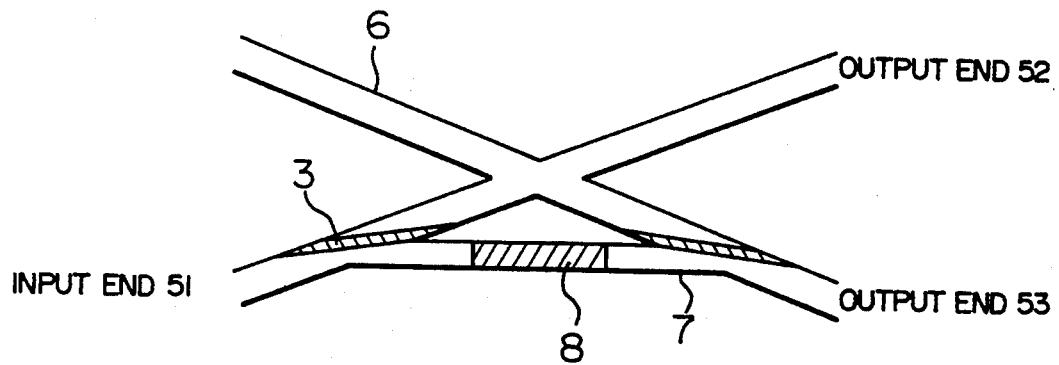
FIG. 6 is a diagram showing another example of the waveguide structure of the embodiment 2.

In the present embodiment, an X-cross optical switch and an single slip optical switch respectively shown in FIGS. 4 and 5 were formed instead of the Y-branch optical switch of the embodiment 1. The structure of the optical waveguide was similar to that of the embodiment 1. Information signal light and destination signal light were inputted to input ends 41 and 42 of a fabricated X-shaped optical switch of FIG. 4 in the same way as the embodiment 1 and characteristics of light outputted from output ends 43 and 44 were examined. In single slip optical switches each having a bypass optical waveguide 7 as shown in FIGS. 5 and 6 as well, information signal light and destination signal light were inputted to an input end 51 and characteristics of light outputted from output ends 52 and 53 were examined. As a result, results similar to those of the embodiment 1 were obtained and it could be thus confirmed that the present invention was valid without depending upon the configuration method of the optical switch. FIG. 6 shows a single slip optical switch obtained by providing the bypass optical waveguide 7 of FIG. 5 with an amplifying means 8. Such an optical switch is described in U.S. Pat. No. 5,044,745 and U.S. Pat. No. 5,146,513 in detail.

Embodiment 3

Figure 7:
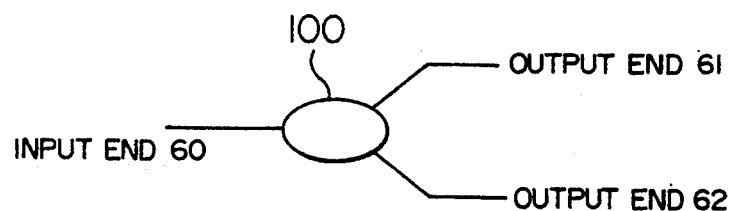
FIG. 7 is a diagram schematically showing an optical switch according to the present invention.
Figure 8:
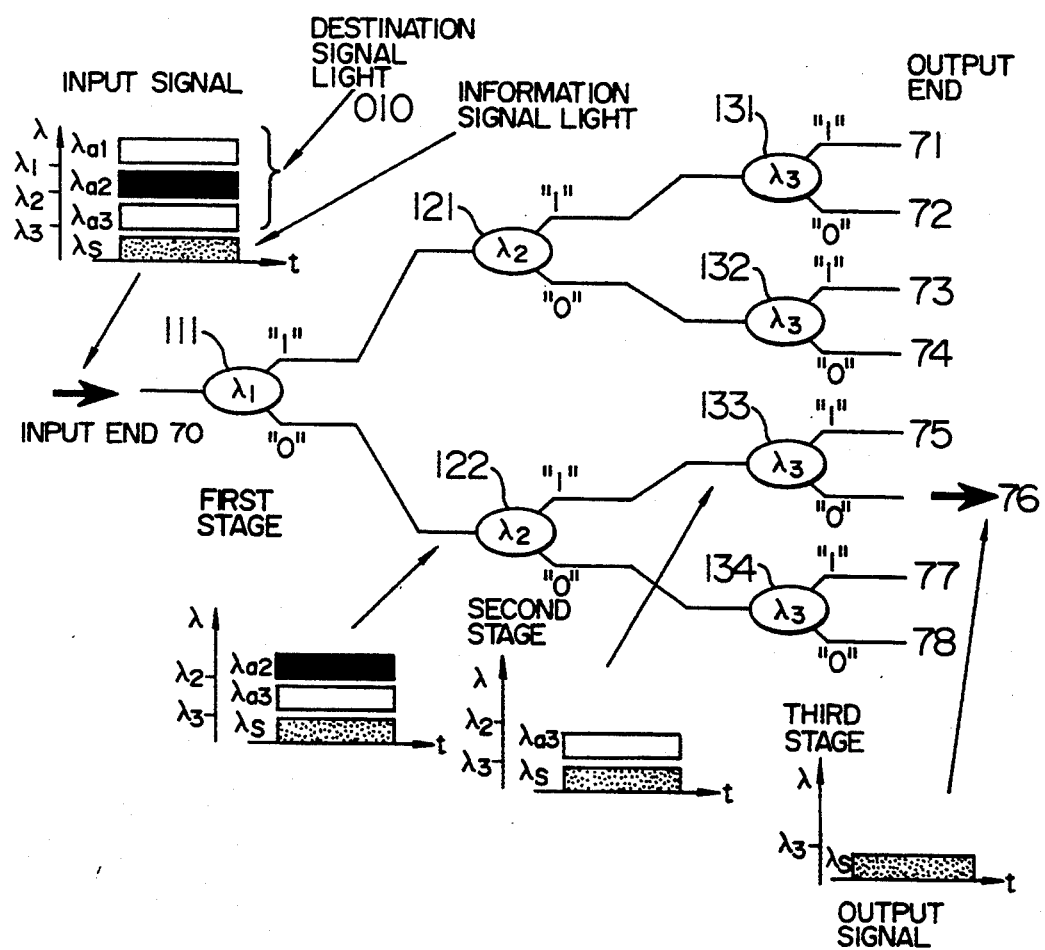
FIG. 8 is a diagram showing an example of an optical switch array configuration of an embodiment 3 according to the present invention.

In the present embodiment, the optical switches described with reference to the embodiment 1 and embodiment 2 were disposed so as to have a shape shown in FIG. 8 to form an optical switch array and the basic function for self-routing was confirmed. In order to describe the configuration in brief, an optical switch 100 of the present invention described in detail with reference to the embodiment 1 and the embodiment 2 is schematically represented as shown in FIG. 7. Information signal light inputted from an input end 60 is outputted from an output end 61 when destination signal light is present whereas the information signal light is outputted from an output end 62 when destination signal light is not present. The optical switches were arranged to form an array having three stages as shown in FIG. 8. Light wave having wavelength-multiplexed information signal light and destination signal light was inputted from an input end 70. In the present embodiment, a multi-stage configuration is used. Absorption edge wavelength $\lambda_1$ of an optical absorption layer located in the switching region of an optical switch 111 of the first stage, absorption edge wavelength $\lambda_2$ of an optical absorption layer located in the switching region of each of optical switches 121 and 122 of the second stage, and absorption edge wavelength $\lambda_3$ of an optical absorption layer located in the switching region of each of optical switches 131, 132, 133 and 134 of the third stage satisfy the following relation:

$$\lambda_1 < \lambda_2 < \lambda_3$$

In order to output the information signal light to a suitable output end included in output ends 71 to 78 as destination signal light, wavelength-multiplexed light having a relation shown in FIG. 9 was used. In FIG. 9, "0" indicates that light having a corresponding wavelength is not multiplexed whereas "1" indicates that the light having the corresponding wavelength is multiplexed. That is to say, the destination code having a bit configuration represented by presence/absence of three waves corresponds to the associated destination bit number of the output end (output end code). As a result, the information signal light multiplexed with the destination signal light is subject to self-routing, automatically led to the corresponding destination output end, and outputted therefrom. Assuming that the wavelength of the information signal light at this time is $\lambda_s$ and wavelengths of destination signal light multiplexed with information signal light used in optical switches of respective stages are $\lambda_{a1}$, $\lambda_{a2}$, and $\lambda_{a3}$, the following relation is satisfied:

$$\lambda_{a1} < \lambda_1 < \lambda_{a2} < \lambda_2 < \lambda_{a3} < \lambda_3 < \lambda_s$$

FIG. 8 shows an example in which $\lambda_{a1}$ of the destination signal light is "0", $\lambda_{a2}$ thereof is "1", $\lambda_{a3}$ thereof is "0", and hence the information signal $\lambda_s$ is outputted to the output end 76.

With reference to the present embodiment, the tree structure having a three-stage configuration has been described as an optical switch array. As a matter of course, however, a similar effect can be obtained even if a configuration of four or more stages is used or even if an array structure other than the tree structure such as the cross bar, simplified tree, Batcher, or Banyan structure is used.

The present invention makes it possible to provide small-sized optical switches and optical switch arrays having a new function (self-routing function) of outputting information signal light to an output end in accordance with a destination signal contained in the information signal light. As a result, it is made possible to construct optical exchanges having high function and high capacity in new optical information processing and communication systems.

What is claimed is:

1. A self-routing optical switch array comprising: m (m=3, 4, 5 . . .) stages, n-th stages of which include $2^{n-1}$ (n−1, 2 . . . ,m) optical switches having one input terminal and two output terminals, wherein an input terminal of an optical switch of an (n+1)-th stage is coupled to an output terminal of an optical switch of an n-th stage, and an output terminal of an optical switch of th (n+1)-th stage is coupled to an input terminal of an optical switch of (n+2)-th stage, and wherein, when an absorption edge wavelength in a switching region of an optical switch of the n-th stage is $\lambda_n$, an absorption edge wavelength in a switching region of an optical switch of (n+1)-th stage is $\lambda_{n+1}$ and an absorption edge wavelength in a switching region of an optical switch of (n+2)-th stage is $\lambda_{n+2}$, the following relation is satisfied:

$$\lambda_n < \lambda_{n+1} < \lambda_{n+2}.$$

2. A self-routing optical switch array according to claim 1, wherein optical switches of the n-th stage absorb a predetermined destination signal light.

3. A self-routing optical switch array according to claim 1, wherein an optical switch of the n-th stage absorbs destination signal light which is different from destination signal light absorbed by an optical switch of another stage.

4. A method of self-routing information signal light through an optical switch, comprising the steps of:
   providing an optical switch having a switching region with an absorption edge wavelength $\lambda$;
   providing wavelength multiplexed signal light comprising information signal light with a wavelength $\lambda_s$ ($>\lambda$) and destination signal light with a wavelength $\lambda_a$ ($<\lambda$); and
   inputting the wavelength multiplexed signal light into the optical switch.

5. A method of self-routing information signal light according to claim 4, wherein the destination signal light with wavelength $\lambda_a$ has a time width longer than a time width of the information signal light with wavelength $\lambda_s$.

6. A waveguide optical switch inputting wavelength multiplexed signal light which comprises information signal light and destination signal light, comprising:
   an input end;
   two output ends coupled to the input end; and
   a switching region comprised of compound semiconductor material, disposed between the input end and one of the output ends,
   wherein a refractive index of the switching region is varied by absorbing the destination signal light so that the information signal light passes through the switching region.

7. A waveguide optical switch according to claim 6, wherein the destination signal light is applied to the switching region for a time sufficient for passing the information signal light.

* * * * *